(12) United States Patent
Kawakami et al.

(10) Patent No.: US 7,265,834 B2
(45) Date of Patent: Sep. 4, 2007

(54) POLARIZATION ANALYZER

(75) Inventors: Shojiro Kawakami, Sendai (JP); Takashi Sato, Sendai (JP); Takayuki Kawashima, Sendai (JP); Wataru Ishikawa, Shichigahama-machi (JP)

(73) Assignee: Autocloning Technology Ltd., Miyagi (JP)

( * ) Notice: Subject to any disclaimer, the term of this patent is extended or adjusted under 35 U.S.C. 154(b) by 0 days.

(21) Appl. No.: 10/537,314

(22) PCT Filed: Jul. 14, 2003

(86) PCT No.: PCT/JP03/08888

§ 371 (c)(1),
(2), (4) Date: Jan. 4, 2006

(87) PCT Pub. No.: WO2004/008196

PCT Pub. Date: Jan. 22, 2004

(65) Prior Publication Data

US 2006/0126066 A1   Jun. 15, 2006

(30) Foreign Application Priority Data

Jul. 13, 2002   (JP) ............................. 2002-237212

(51) Int. Cl.
*G01J 4/00*   (2006.01)
(52) U.S. Cl. .................................... 356/364

(58) Field of Classification Search ................ None
See application file for complete search history.

(56) References Cited

U.S. PATENT DOCUMENTS 4,902,112 A * 2/1990 Lowe .................... 359/489

FOREIGN PATENT DOCUMENTS

EP           1 103 829 A1 *   5/2001

* cited by examiner

*Primary Examiner*—Tu T. Nguyen
(74) *Attorney, Agent, or Firm*—Westerman, Hattori, Daniels & Adrian, LLP.

(57) ABSTRACT

A thin polarizer array and a wavelength plate array that are composed of micro regions having different optical axis directions and wavelength characteristics and having a high extinction ratio and a low insertion loss, and a polarization analyzer using them. An array of micro periodic grooves is formed on a substrate, with the directions changed from one region to another. An alternating multilayer film formed by bias sputtering alternating a layer of high refractive index material such as Si or $Ta_2O_5$ and a layer of low refractive index material such as $SiO_2$. By selecting a condition that each layer maintains its periodic projecting/recessed shape, an array of photonic crystal polarizer is formed. By mounting this array of photonic crystal polarizer in a photodetector array, a polarization analyzer that is small, has no movable part, has a small number of components, and enables high-precision measurement is constituted.

17 Claims, 17 Drawing Sheets

Fig. 6
Fig. 6(A)
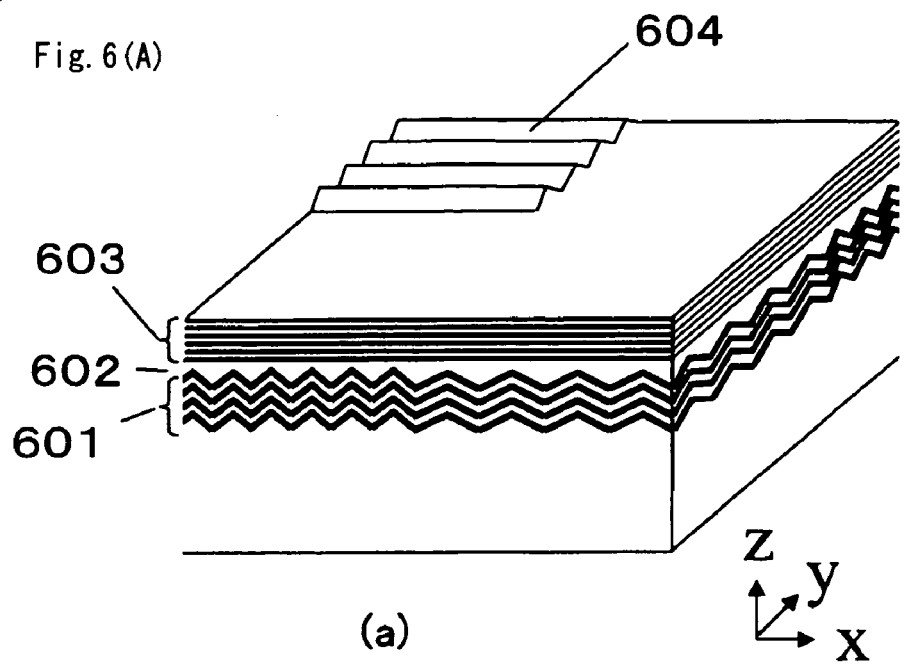
(a)
Fig. 6(B)
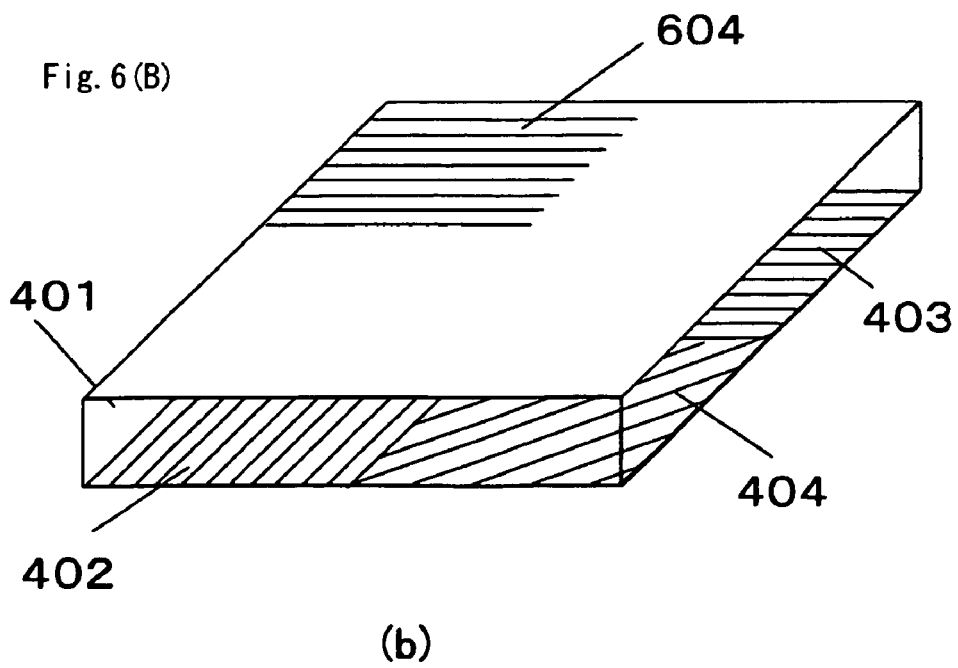
(b)

Fig. 17
Fig. 17(A)
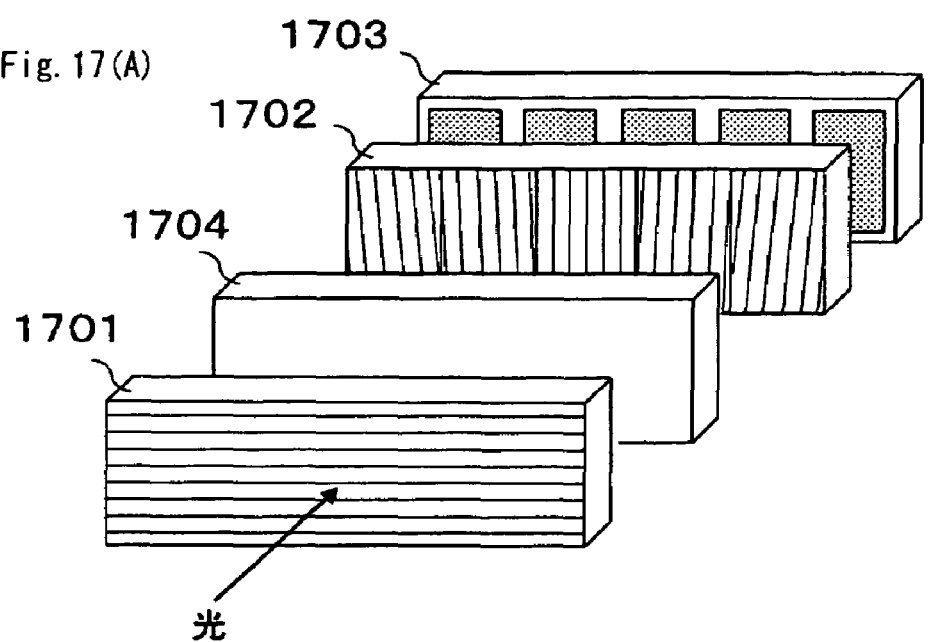
光
(a)
Fig. 17(B)
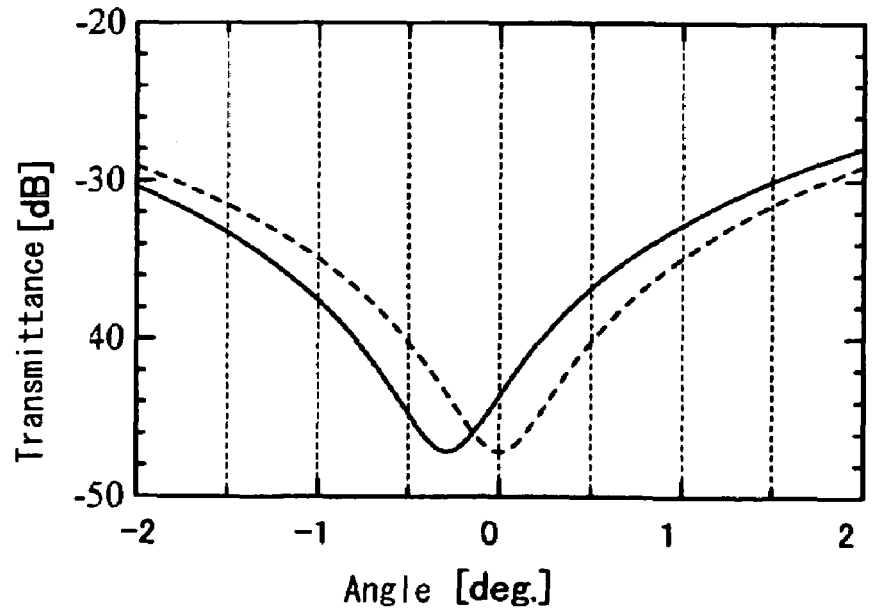
(b)

Fig. 18
Fig. 18(A)
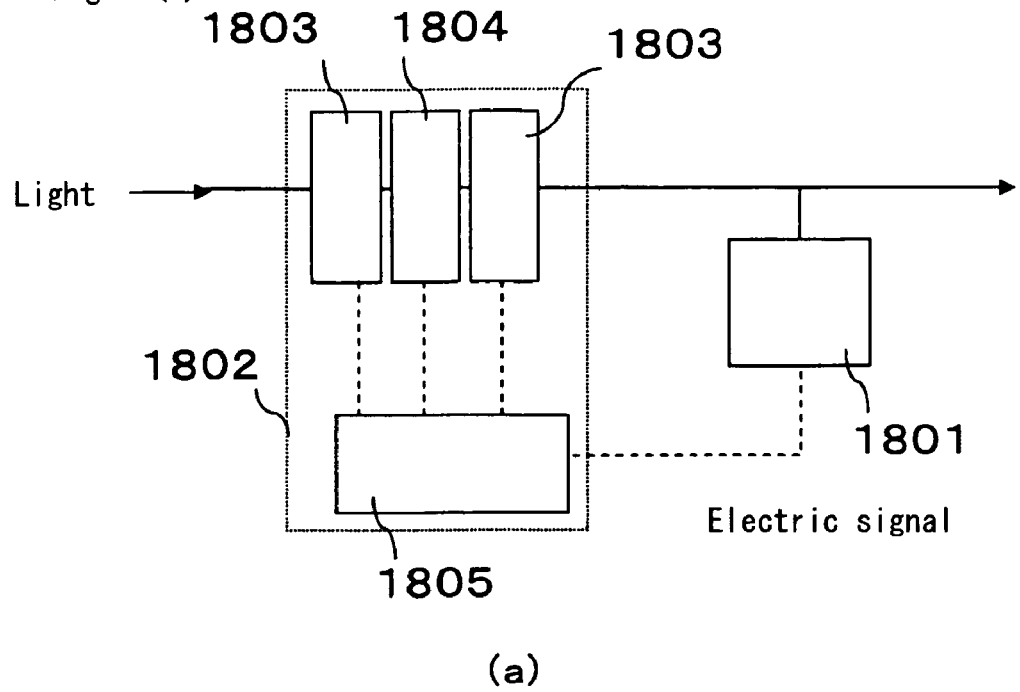
(a)
Fig. 18(B)
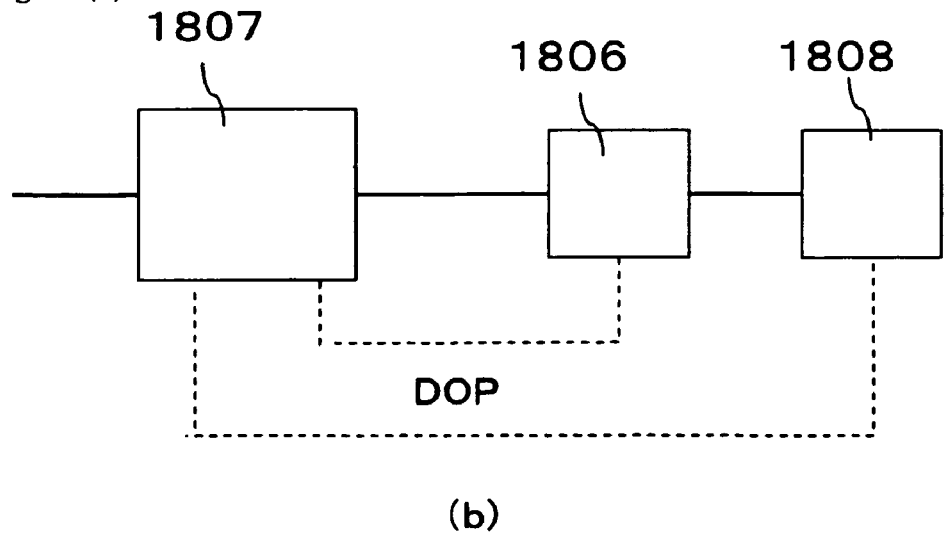
(b)

POLARIZATION ANALYZER

CROSS REFERENCE TO RELATED APPLICATIONS

This application is a 35 USC § 371 National Stage application of PCT Application No. PCT/JP03/08888 filed Jul. 14, 2003, which claims the benefit under 35 USC § 119(a) of Japan Application No. 2002-237212 filed Jul. 13, 2002.

TECHNICAL FIELD

The present invention relates to a polarization analyzer composed of a plurality of small regions and using an array of polarizers and waveplates having different optical axis directions.

BACKGROUND ART

A polarizer, which is one of polarized light control devices, is a device to transmit only a vibration component in a specific direction of unpolarized light or elliptically polarized light in which an electromagnetic field vibrates in unspecific directions to obtain linearly polarized light. The polarizer is one of the most basic optical devices. The device is commonly used in an optical communication device, an optical pickup for an optical disk, a liquid crystal display, an optical application measurement, and the like. Polarizers are roughly classified into two groups by the operation type; 1 st grope directs to a polarizer which absorbs an unnecessary polarized wave and, 2nd grope directs to a polarizer which divides two orthogonal polarized wave components being incident on the same optical path into different optical paths.

Polarizers practically used at present, which performs the operation 1, a polarizer obtained by inserting dichromatic molecules such as iodine molecules into a polymer film, a glass in which needle-shaped metal particles are aligned in one direction, or the like is used. On the other hand, as the polarizer of the type 2, a polarizing prism made of a high-birefringent material such as calcite is used.

The other polarized light control device is a phase plate which delays polarized light by polarization. Namely, anisotropic materials having different refractive indexes depending on orientations are used. In general, anisotropic crystal such as quartz or rutile or a film obtained by drawing polyimide is used.

In any of the above polarized light control devices, characteristics of a polarizer or a waveplate on an aperture plane are constant within a fabricating error. More specifically, a wavelength and an optical axis in which the device operates are uniform on the aperture plane. This is because, on a manufacturing process, a device except for a device having a size of millimeters or more or centimeters or more cannot be manufactured since an anisotropic singlecrystalline material is polished or a film or glass is drawn in one direction. Each device may be cut into devices having small sizes, and the cut devices may be pasted to have different axes. However, a reduction in area of one device and a reduction in number of devices to be pasted are limited. In addition, it is difficult to accurately align the axes of small chips.

In recent years, a method of arranging small polarized light control devices in an array by fully using a lithography technique is reported.

For example, lines and spaces are processed in a metal film to form a polarizer. For example, a polarizer described in 31a-W-2 in The Japan Society of Applied Physics National Conference, 2000, spring, a polarizer described in U.S. Pat. No. 6,122,103, and a polarizer described in the following paper: (Applied Physics Letters, vol. 77, no. 7, pp. 927 to 929, August 2000) are known. These polarizers are based on the following principle. That is, since electrons in a metallic thin wire can move in a direction parallel to the thin line but cannot smoothly move in a direction perpendicular to the metallic thin wire, a polarized wave, which is parallel to the thin line, of incident light is absorbed largely more than a polarized wave in the perpendicular direction. In order to achieve a low loss and a high extinction ratio, it is required to infinitely increase an aspect ratio of the metallic thin wire. However, in fact, since the metallic thin wire has a finite width, an insertion loss does not become 0 in principle.

Similarly, lines and spaces of a transparent material form a waveplate. However, since the depth of a groove directly influence a phase difference, a groove having a high aspect ratio cannot be easily processed with high reproducibility. In addition, since the depths of grooves processed by one process cannot be changed depending on regions, a phase difference is constant at the same location. More specifically, a quarter waveplate and half waveplate cannot be simultaneously formed. An array cannot be formed by combining a phase plate and a polarizer.

For this reason, when a plurality of polarizers and a plurality of waveplates having different optical axes and different wavelengths are to be combined to each other, a large-scale apparatus which splits a light beam and uses independent devices is required. In particular, in a conventional polarization analyzer, as shown in FIG. 3, a large number of independent devices such as a light beam splitter 301, a polarized light beam splitter 302, a polarizer 303, a quarter waveplate 304, and a right-receiving device 305 are used, i.e., the number of parts is large. The analyzer is so complex that axes must be aligned at high accuracy. Actually, all the devices cannot be pasted at a 0.1° order. In addition, it is not realized that a polarizer array composed of the metal lines and spaces is mounted on a CCD camera or the like to perform polarized light image analysis because sufficient characteristics such as a high extinction ratio of the polarizer and high productivity cannot be achieved.

DISCLOSURE OF THE INVENTION

In order to solve the above problem, the present invention provides to form high-performance polarizers and phase plates as small arrays having different orientations and different wavelength characteristics by using photonic crystal based on a multi-layer film sputter forming method (method which is disclosed in Japanese Patent Publication No. 3325825 and to be referred to as autocloning hereinafter).

The outline of a polarizer has been described above. Recently, a type of a photonic crystal polarizer (Japanese Patent Publication No. 3288976) that is different from the conventional type or a photonic crystal birefringent material (Japanese Patent Laid-Open No. 2000-51122) is developed. The possibilities of the polarizer or the material attract attention of various fields. Outlines of these photonic crystal polarized light control devices will described below. On a glass substrate 101 in which periodic lines of grooves are formed as shown in FIG. 1, a transparent medium 102 having a high refractive index and a medium 103 having a low refractive index are alternately laminated while keeping the shapes of interfaces. Each layer has periodicities in an x direction and a z direction. However, the layer may be uniform in a y direction. The layer may have a periodic or nonperiodic structure having a length which is larger in the y-axis direction than in the x-axis direction.

When unpolarized light or elliptically polarized light is incident on the periodic structure obtained as described above from the z direction, light in a TE mode or a TM mode is excited to each of a polarized wave parallel to the groove line, i.e., a y-polarized wave and an x-polarized wave orthogonal to the y-polarized wave in the periodic structure. FIG. 2 is a band diagram showing propagation characteristics obtained when the medium 102 consists of Si and the medium 103 consists of $SiO_2$. The abscissa indicates a propagation constant which is equal to a value obtained by normalizing a change in phase obtained when light propagates by one period in the z direction by $\pi$. The ordinate indicates a reciprocal of a wavelength normalized by the z-direction period. When the frequency of the incident light is in the bandgap, the light in the mode cannot propagate in the periodic structure, and the incident light is reflected or diffracted. On the other hand, when the frequency of the light is in an energy band, the light transmits through the periodic structure. According to FIG. 2, there are a frequency region 201 in which the light in the TE mode is in the bandgap, a frequency region 201 in which the light in the TE mode is in the bandgap, and a frequency region 203 in which light in both the modes are in the energy band. In the frequency bands of the frequency region 201 and the frequency region 202, the device operates as a reflective polarizer or a polarized light separation device. In the frequency band of the frequency region 203, the device operates as a waveplate.

A polarizer or a waveplate consisting of the photonic crystal has an operation wavelength band which can be freely set by controlling the refractive index, a filling rate, a period $L_x$ of the groove line, and a period $L_2$ in the laminating direction of the material constituting the device. As a low refractive index medium, a material containing $SiO_2$ as a main component is most usually used. The material has a wide transparent wavelength band and good chemical, thermal, and mechanical stabilities, and can easily forms a film. However, other optical glass may also be used, and a material such as $MgF_2$ having a low refractive index may be used. As a high refractive index material, a semiconductor such as Si or Ge or an oxide or a nitride such as $Ta_2O_5$, $TiO_2$, $Nb_2O_5$, HfO, or $Si_3N_4$ can also be used. The oxide or the nitride has a wide transparent wavelength range, and can also be used in a visible light region. On the other hand, although the semiconductor is used in only an near-infrared region, the semiconductor has a high refractive index advantageously.

In a fabricating method, as shown in FIG. 1, periodic grooves are formed on a quartz glass substrate by electron beam lithography and dry etching. On the substrate, $SiO_2$ layers and Si layers are alternately laminated by a bias sputtering method (process obtained by combining sputter film formation and sputter etching) using $SiO_2$ and Si as targets. At this time, it is important that the film is formed while keeping periodic uneven shapes in an x-axis direction of each layer. This is called an autocloning technique disclosed in Japanese Patent Publication No. 3325825. The technique is an excellent method which fabricates an industrially small periodical structure (photonic crystal) with good reproducibility and good uniformity. The reason why a regular laminate structure is formed on a substrate can be explained by a combination of the following three functions; 1: deposition by dispersive incidence of neutral particles from the targets, 2: sputter etching by perpendicular incidence of Ar ions, and 3: reattachment of deposited particles.

The structure in FIG. 1 operates as a polarizer in the frequency regions 201 and 202. As the features of the polarizer having the structure, a high extinction ratio of transmitted light, thin and light weight, and capability of forming the polarizer on an arbitrary substrate, and the like are cited. According to numerical simulation and experiment, in particular, the frequency region 201 on the high-frequency region is used, and a high extinction ratio of 50 dB can be realized by a small number of laminated layers, i.e., 10 periods.

A material and a shape or a period of a unit cell of a periodic structure are selected in the structure in FIG. 1 to make it possible to realize a waveplate using the frequency region 203. A TE wave which is polarized light parallel to the groove and a TM wave perpendicular to the groove propagate. However, since the TE wave and the TM wave have different propagation constants, a phase difference is given to these waves. In design on a high-frequency side, a phase difference per period is large. For this reason, a desired phase difference can be realized by a small number of periods. Furthermore, since a period in plane is large, processing accuracy can be advantageously prevented from being severe. On the other hand, design on a low-frequency side is suitably applied to phase difference control having higher accuracy. It is important that a waveplate is designed on the basis of a wavelength band in which the waveplate operates, required characteristics, and the like.

The aperture areas and the orientations of the polarizers and the phase plates are freely designed by the size and direction of a groove pattern to be processed in a substrate first. The pattern formation can be performed by various methods such as electron beam lithography, photolithography, an interference exposure method, and nano-printing. In any cases, the directions of the grooves can be determined at high accuracy in respective small regions. For this reason, small polarizer arrays or small phase plate arrays having different orientations can be formed. Furthermore, since the polarizers and the phase plates operate in only a specific region having an uneven pattern, when a region around the specific pattern has a flat pattern or an uneven pattern isotropic in plane, the polarizer or the phase plate transmits light as a medium being free from polarizing dependency. Therefore, the polarizer or the phase plate can be formed in only the specific region.

In addition, when the period of the uneven pattern in plane is changed in the structure in FIG. 1, a propagation characteristic changes even though the period of the laminated layers. Therefore, periods in plane are changed depending on regions to make it possible to fabricate arrays of polarized light control devices (polarizers or waveplates) having different optical axes and wavelength characteristics.

BRIEF DESCRIPTION OF DRAWINGS

FIG. 6 is a diagram showing a structure obtained by integrally forming a waveplate and a polarizer;

FIG. 17 is a diagram showing the structure of a polarization analyzer obtained by a polarizer array and a light-receiving device array; and FIG. 18 is a diagram showing a structure of 18A a polarization stabilizer and 18B a polarization mode dispersion compensator using a polarization analyzer.

BEST MODE FOR CARRYING OUT THE INVENTION

A polarization analyzer composed of a small polarizer array consisting of autocloning type photonic crystal and having different optical-axis directions and a light-receiving device array or a polarization analyzer obtained by adding a quarter waveplate to the former polarization analyzer will be described below. The polarization analyzer can be used when polarization of signal light in optical communication, or the polarization analyzer can be used in various optical sensors.

Figure 1:
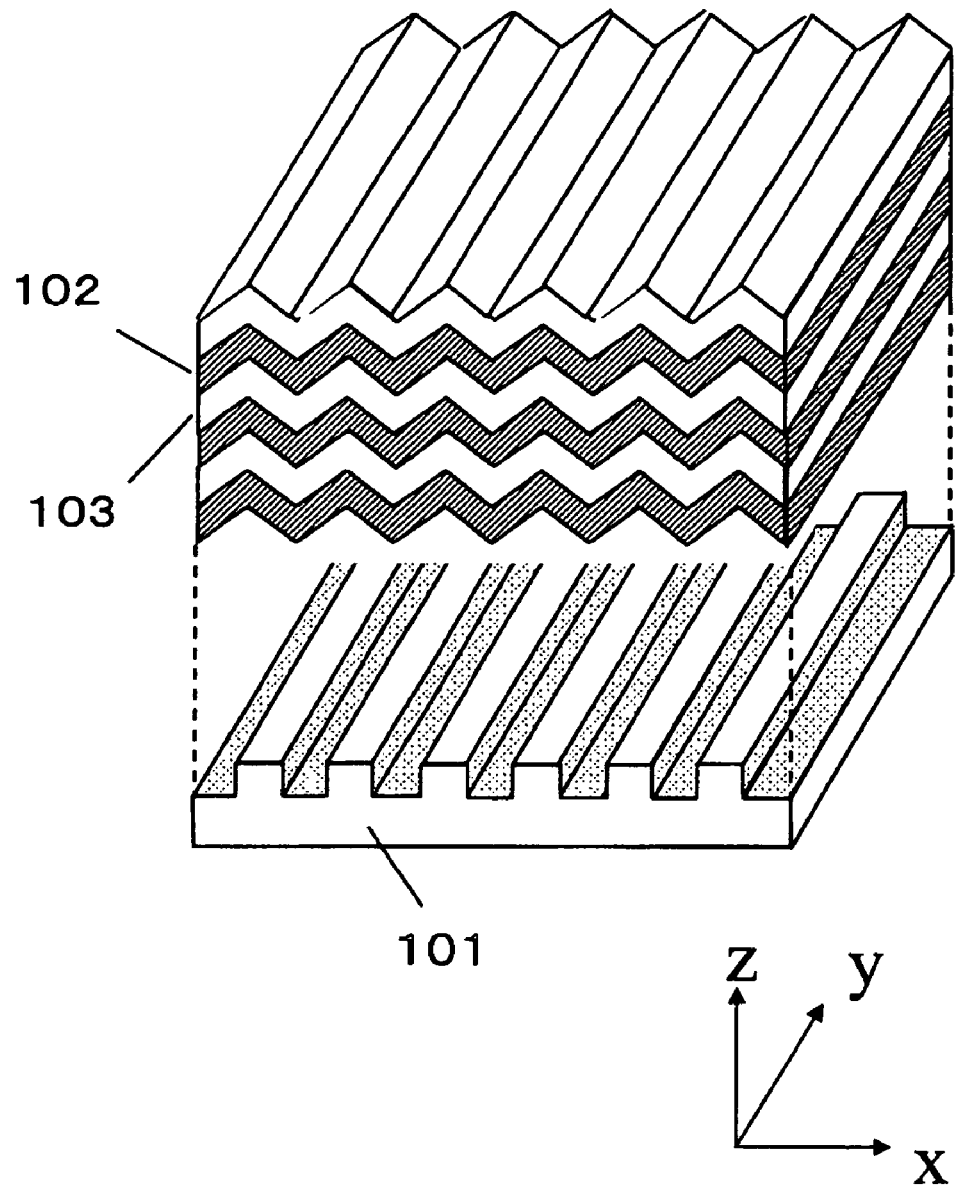
FIG. 1 is a conceptual diagram of the main body of a photonic crystal polarized light control device.
Figure 2:
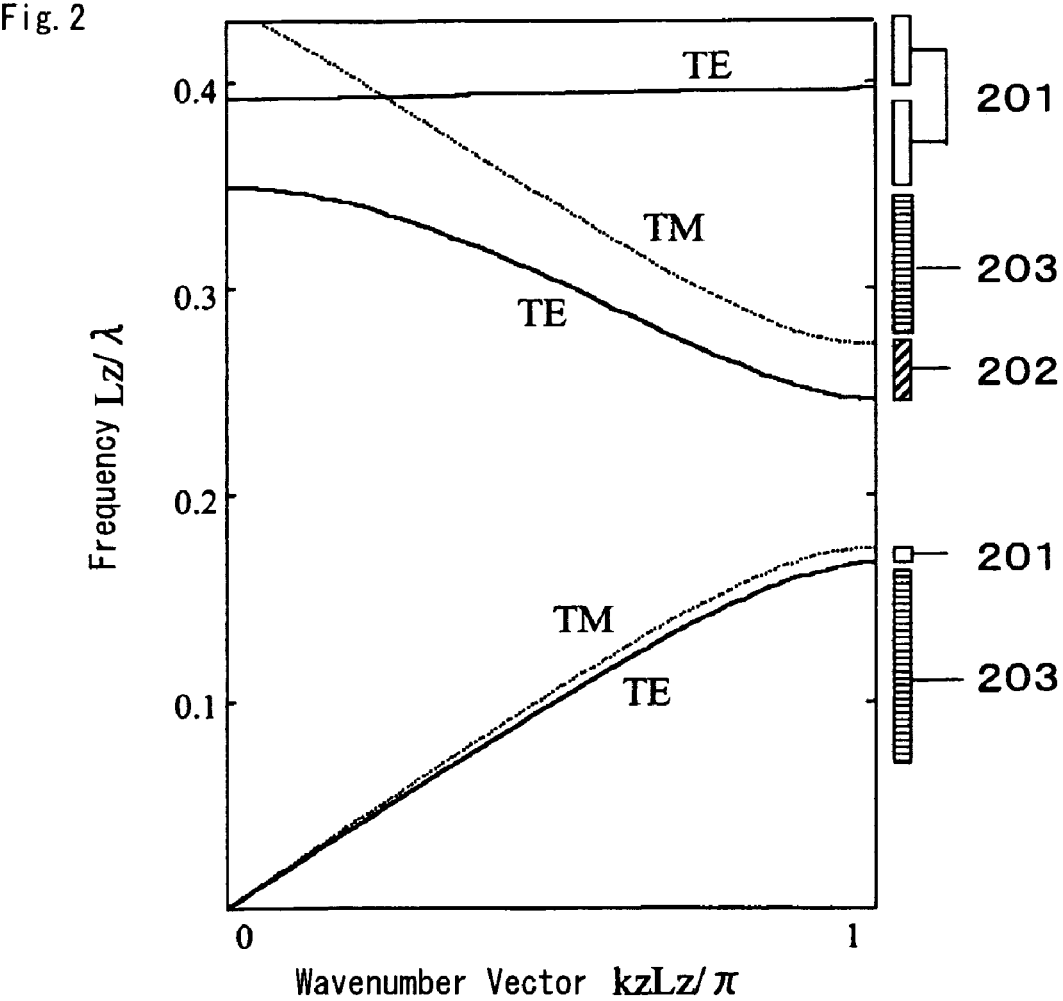
FIG. 2 is a band diagram showing propagation characteristics of the photonic crystal shown in FIG. 1.
Figure 4:
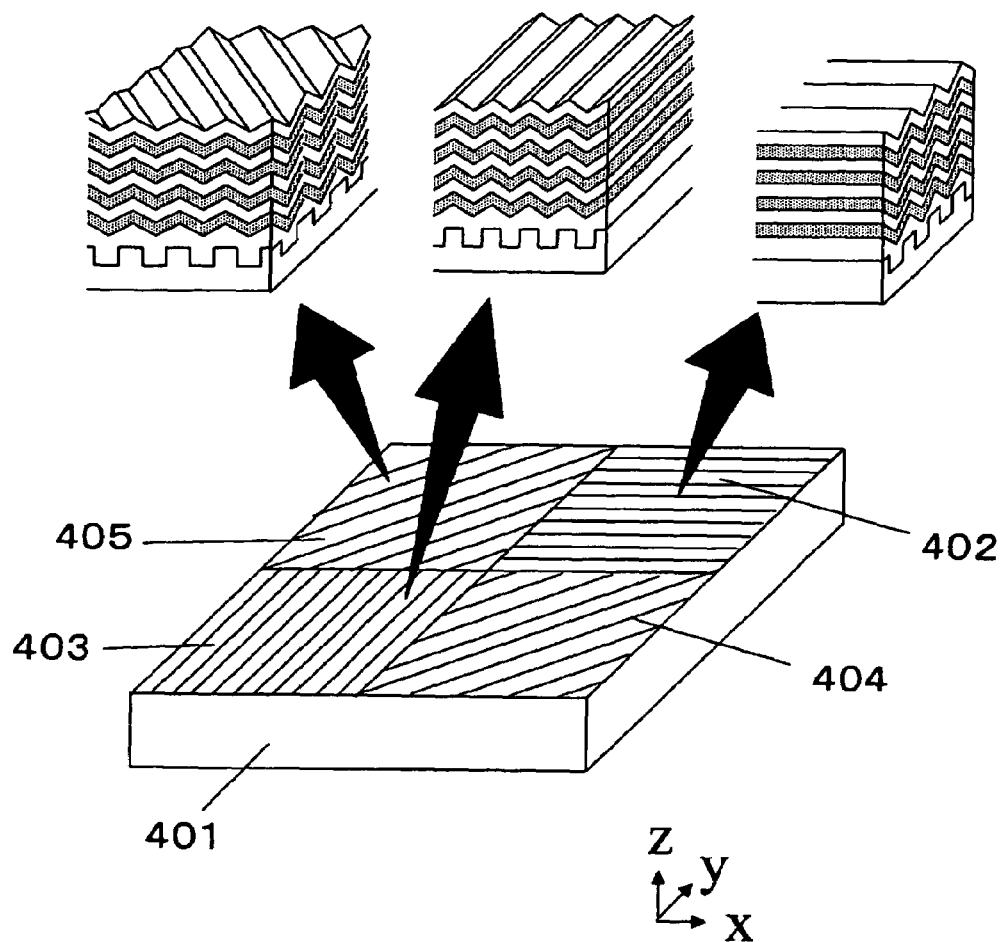
FIG. 4 is a diagram for explaining a polarizer having four regions.

At first, a polarizer array 401 shown in FIG. 4 will be described. A polarizer has a structure shown in FIG. 1, and is composed of an alternative multilayer film consisting of Si and $SiO_2$. Four divided regions are formed on an x-y plane. Each film has an uneven shape in each region. The films are periodically repeated in one direction on the x-y plane determined in each region. The direction of the grooves in a first region 402 is set at 0° to the x axis. The direction of the grooves in a second region 403 is set at 90°, and the directions of the grooves in the third and fourth regions 404 and 405 are set at 45°. The arrangements are not limited to the above arrangement and can be freely arranged. For example, the two 45° regions 404 and 405 may be adjacent to each other, and the regions 402 to 405 are arranged at four angles, i.e., 0°, 90°, and ±45°, respectively.

These regions operate as the photonic crystal polarizers. In this case, an operation wavelength is set at 1.55 µm for optical communication. An in-plane frequency is 0.5 µm, and a lamination period is 0.63 µm. A ratio of thicknesses of Si and $SiO_2$ is given by 4:6. Each region is 200 µm-square. When the number of lamination periods is 12, and when a wavelength is 1.55 µm, an extinction ratio is 45 dB or more, and an insertion loss is 0.15 dB or less.

However, materials and structure parameters are freely selected. For example, as high refractive index materials, $Ta_2O_5$, $TiO_2$, and $Nb_2O_5$ may be used. As low refractive index materials, pyrex glass, $MgF_2$, and other optical glass may be used. When an operation wavelength is an infrared wavelength, as high refractive index materials, Ge, SiGe, and the like can be used. Dispersion relationships between the polarized waves depend on a ratio of thicknesses, an in-plane period, a lamination period, and the angle of an inclined plane. A wavelength band in which the polarizer operates changes. Therefore, the polarizer can be designed and fabricated to an arbitrary wavelength band extending from visible light/ultraviolet to infrared.

Figure 5:
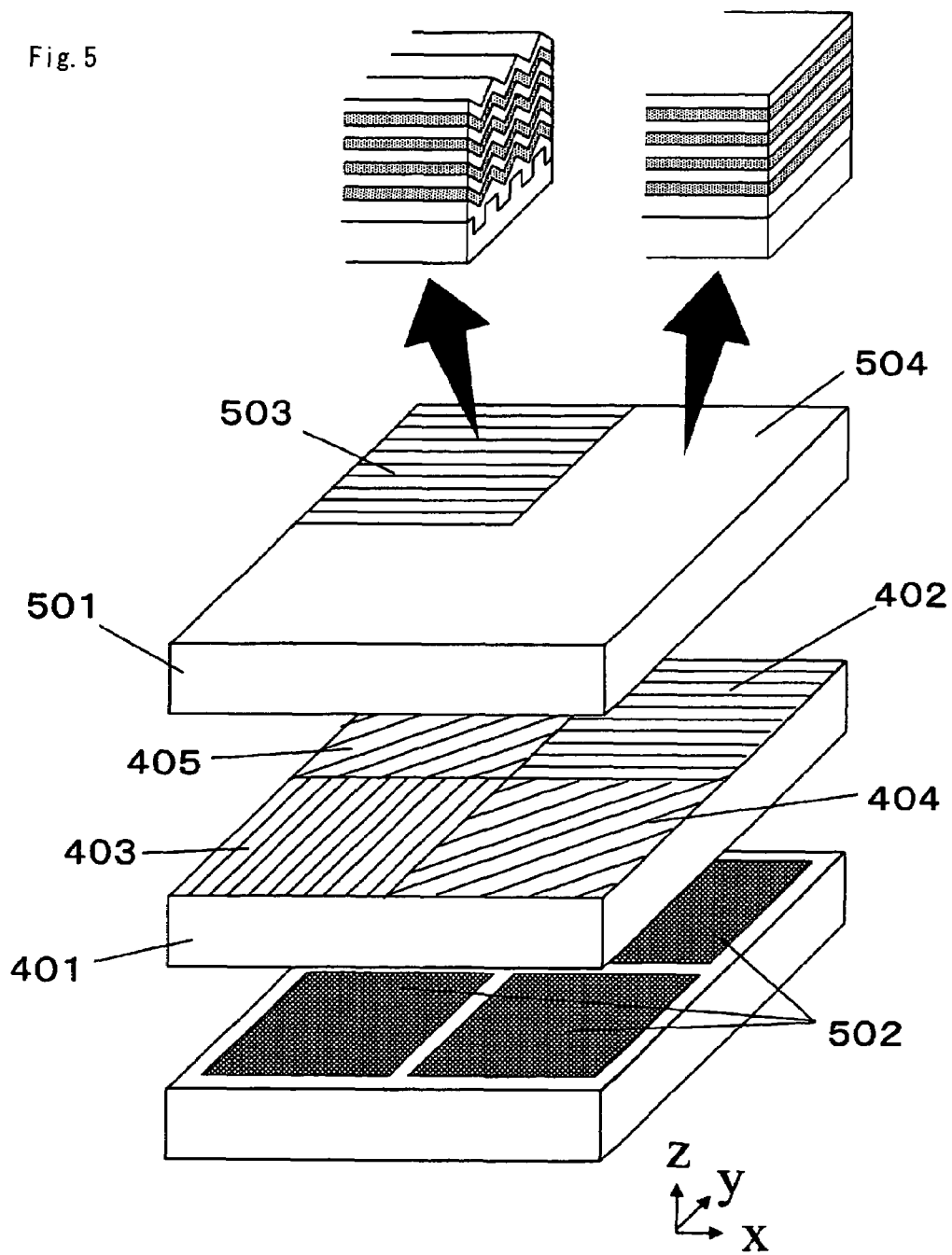
FIG. 5 is a diagram showing the structure of a polarization analyzer obtained by combining a waveplate, a polarizer, and a light-receiving device.

FIG. 5 is a conceptual diagram of a polarization analyzer obtained by combining a device 501 partially including a region operating a quarter waveplate and a light-receiving device array 502 to the polarizer array 401.

The waveplate is composed of a region 503 operating a quarter waveplate and a region 504 which does not generate a phase difference. The region operating as the waveplate consists of photonic crystal having the structure in FIG. 1. More specifically, films have uneven shapes parallel to the x axis, and are repeated in a y-axis direction. The region 504 that does not operate as a phase plate is a flat multilayer film. In this case, a period of grooves is set at 0.52 µm. The materials of the films are $Ta_2O_5$ and $SiO_2$, a ratio of film thicknesses is 4:6, and a lamination period is 0.62 µm. Therefore, an uneven shape may be formed in only the region 503 on the substrate.

In this case, a part that does not operate as the waveplate is made flat. However, the part may have an uneven, concave and convex, shape having an isotropic period pattern. Although some cumbersome operation must be performed, once a quarter waveplate region is formed on one surface, only a necessary part may be removed by etching.

After a polarizer array and a waveplate are fabricated, the polarizers are pasted such that the region 405 having a 45° axis and the quarter waveplate region 503 of the polarizers overlap. In this case, the polarizers may be pasted such that the film surfaces of the respective substrates face upward, may be overlapped such that surfaces on the film sides face each other.

FIG. 6 shows an example in which the polarizer array and a waveplate are integrated with each other. In FIG. 6A, a multilayer film 601 is laminated, and a final layer (in this case, an $SiO_2$ layer) 602 is laminated to have a slightly large thickness. At this time, when sputter etching is strongly effected, the uneven pattern form on the surface is eliminated to be flat. Mechanical polishing may be used without any special problem. Thereafter, an uneven line-and-space pattern is formed in a part in which a waveplate is formed by lithography again. In pattern alignment, a marker for alignment may be applied in a part of the substrate in advance. Thereafter, a multilayer film 603 to form a region 604 which operates as a quarter waveplate may be laminated. In this manner, the polarizer array and the waveplate can be integrated.

FIG. 6B shows an example in which a waveplate is formed on the rear side of a substrate on which a polarizer array is formed. After a multilayer film for polarizer is laminated, the rear surface of the substrate is patterned to form a waveplate. For alignment for the pattern, a marker may be applied on the substrate. Thereafter, the multilayer film 603 may be laminated to form the region 604 operating a quarter waveplate.

Figure 7:
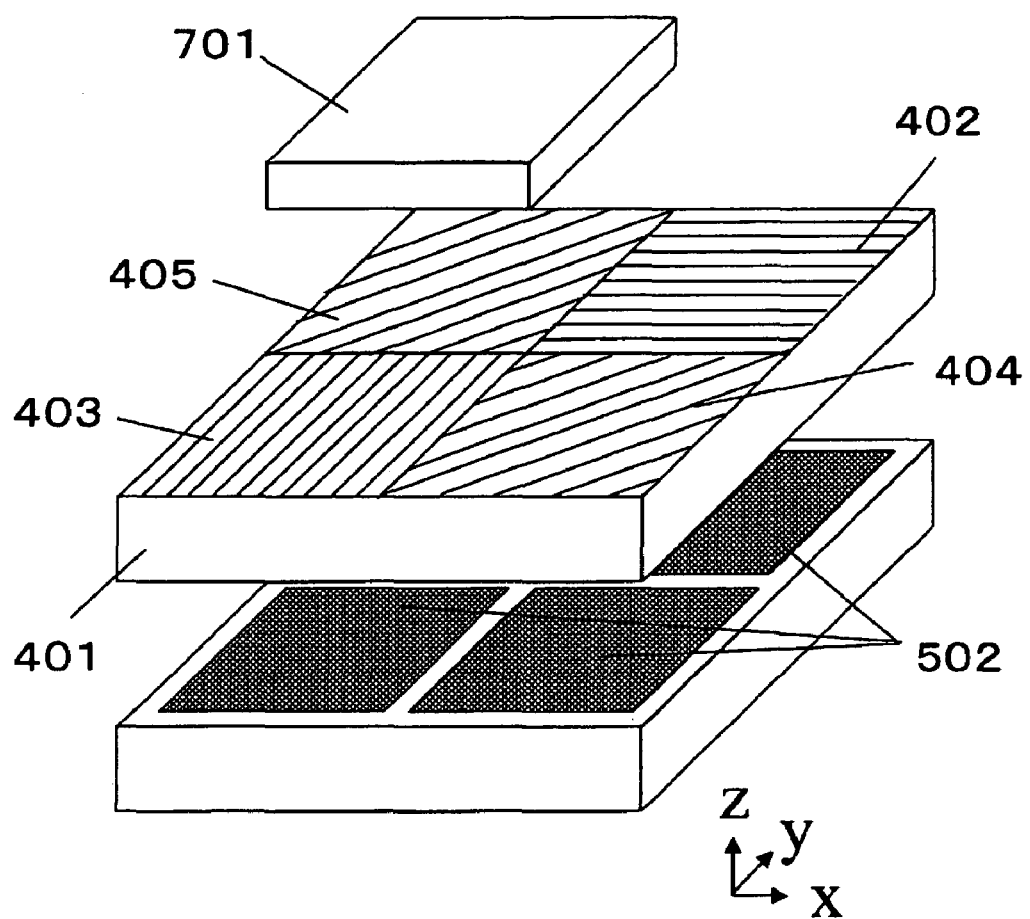
FIG. 7 is a diagram showing a structure of a polarization analyzer obtained by combining a waveplate, a polarizer, and a light-receiving device.

When the size of each region is relatively large, as shown in FIG. 7, as quarter waveplates, independent quarter waveplates 701 consisting of conventional anisotropic crystal or an anisotropic film may be pasted. For example, a waveplate to which refractive-index anisotropy is given by drawing a polyimide film serving as an organic material has a very small thickness of about 10 µm. By using the waveplate as the device 701, a glass substrate may be pasted on the device 701. In addition, anisotropic crystal such as quartz may also be used.

The polarization analyzer shown in FIG. 5 is formed such that, after a polarizer array and a waveplate are integrated with each other, a light-receiving device array which can independently receive light transmitted through the four regions of the polarizer is arranged on the rear surface of each polarizer. A light intensity is measured by each light-receiving device. As the light-receiving device, a photodetector is used. Four light-receiving devices are arranged on an aperture of 500 µm. This size may be large or small such that a light-receiving power can be sufficiently obtained depending on the diameter of an optical beam.

Figure 15:
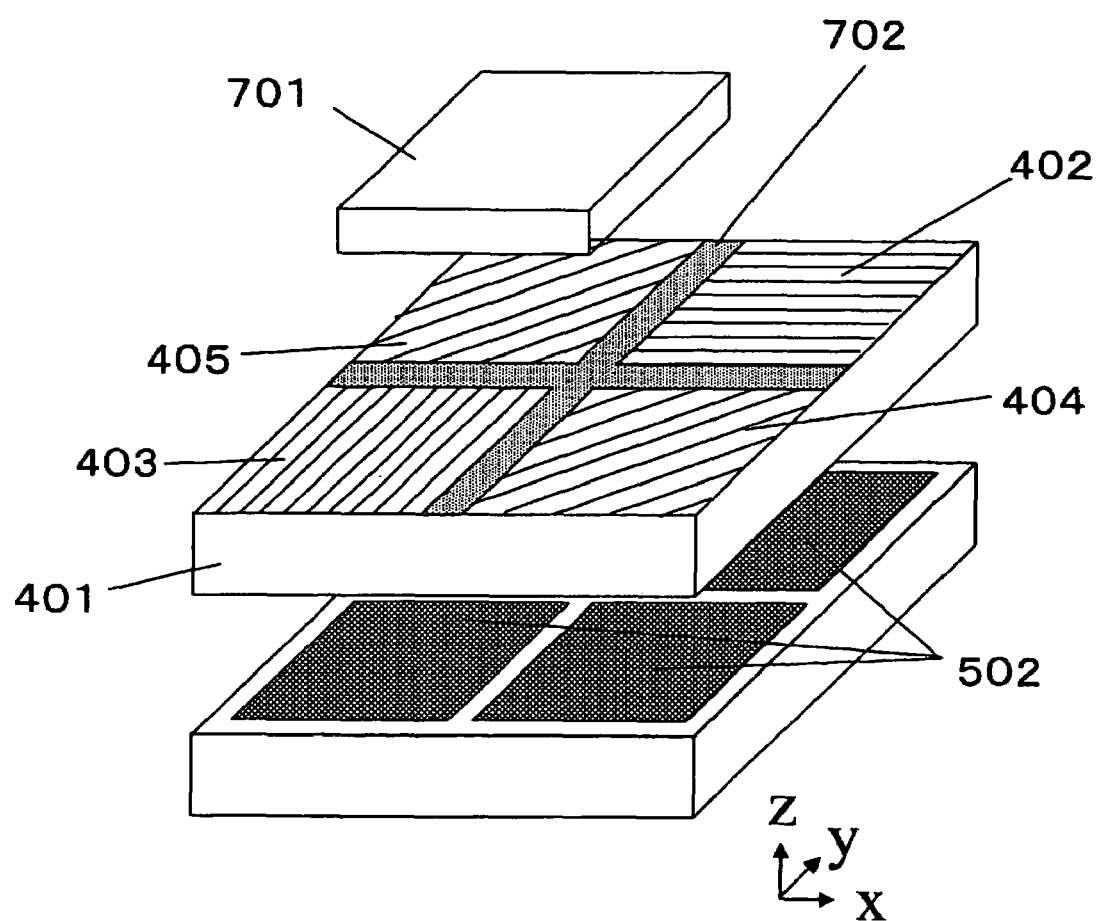
FIG. 15 is a diagram showing the structure of a polarization analyzer obtained by combining a waveplate, a polarizer, a light-receiving device.

It is important that light detected by each of the light-receiving devices is light transmitted through a corresponding polarizer, i.e., a crosstalk is small. Since light transmitted near a boundary of the polarizers spreads by diffraction, the polarizer may be arranged as close to the light-receiving device as possible, or a light-impermeable region 702 may be arranged on the boundary between the polarizers as shown in FIG. 15.

In this manner, a Stokes' parameter representing a polarization state of light can be calculated, and complete polarization analysis including a degree of polarization can be performed. More specifically, when fourth light intensities of an x-polarization component $I_x$, a y-polarization component $I_y$, a 45° polarization component $I_{45}$, and a 45° polarization component $I_{Q45}$ obtained after light is transmitted through the quarter waveplate having an optical axis along the x-axis direction are used, four Stokes' parameter $S_0$ to $S_3$ are expressed as follows:

$$S_0=I_x+I_y$$

$$S_1=I_x-I_y$$

$$S_2=2I_{45}-(I_x+I_y)$$

$$S_3=2I_{Q45}-(I_x+I_y).$$

Therefore, the power of light transmitted through the polarizer 402 is given by $I_y$, the power of light transmitted through the polarizer 403 is given by $I_x$, the power of light transmitted through the polarizer 404 is given by $I_{45}$, and the power of light transmitted through the waveplate and the polarizer 405 is given by $I_{Q45}$. On the basis of these measured values, Stokes' parameters can be calculated.

Figure 16:
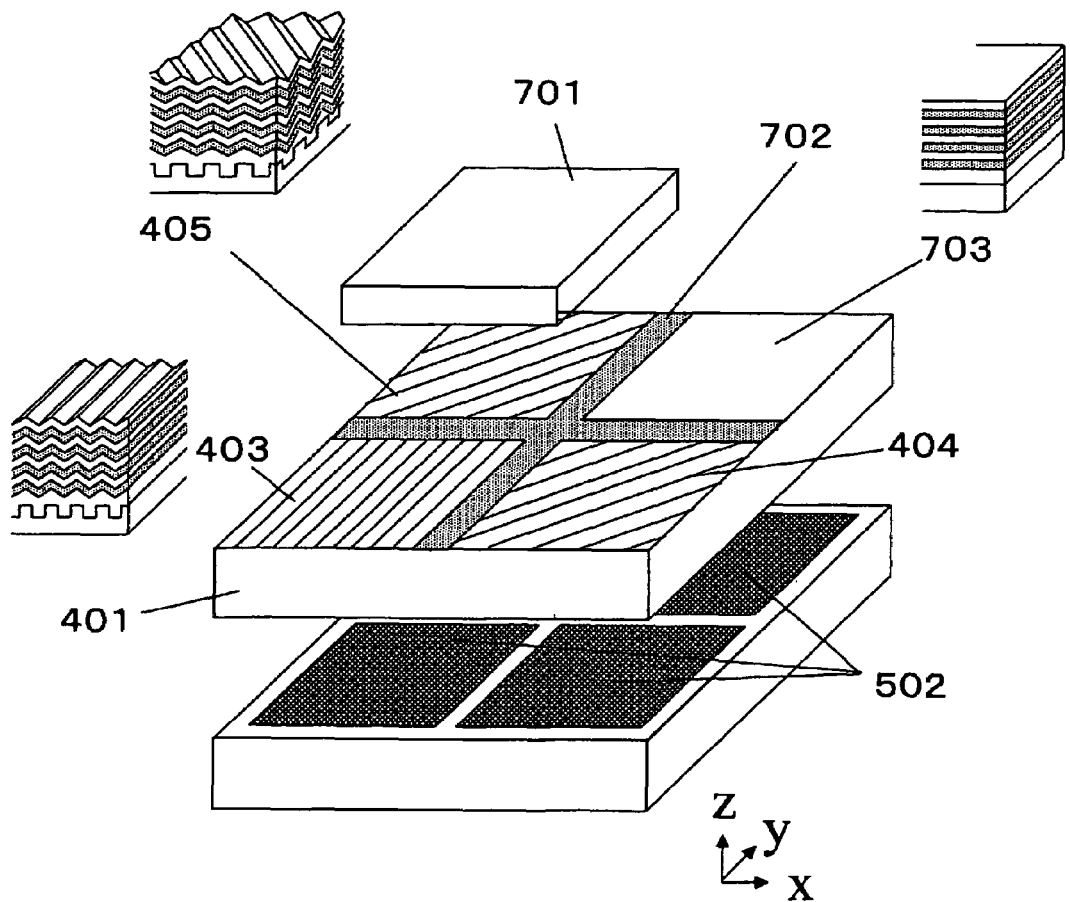
FIG. 16 is a diagram showing the structure of a polarization analyzer obtained by combining a waveplate, a polarizer, a light-receiving device.

The axis directions of the polarizers are explained as three directions, i.e., 0°, 90°, and 45°. Even though another combination of directions is used, Stokes' parameters can be calculated. For example, as shown in FIG. 16, one flat part may be formed. When the light-receiving power of the part is given by $I_t$, the above equations can be substituted by $I_t=I_x+I_y$.

Figure 3:
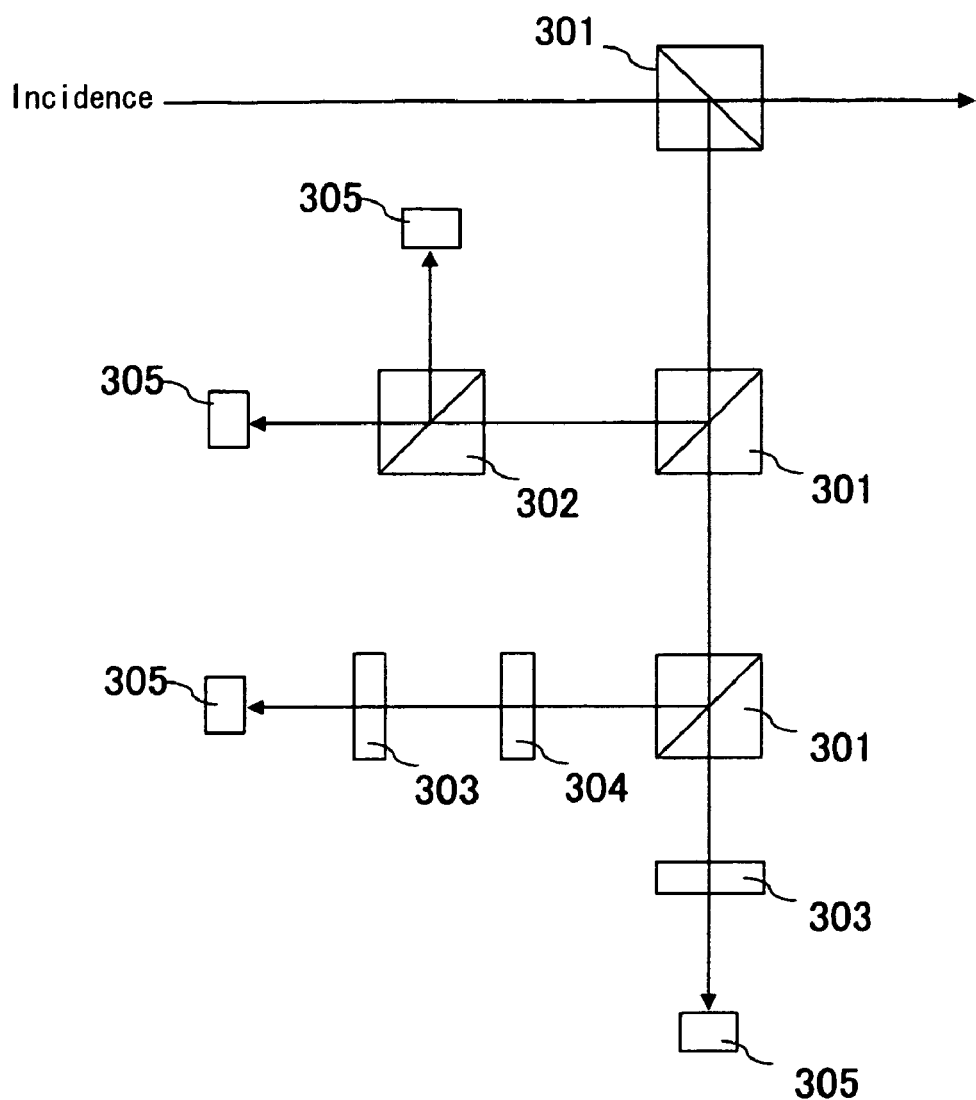
FIG. 3 is a diagram showing the configuration of a conventional polarization analyzer.

When the polarization analyzer is compared with the conventional polarization analyzer shown in FIG. 3, the number of parts can be reduced, and a small size can be achieved. In addition, a polarization analyzer which can performs measurement at high accuracy can be easily realized. One reason for lowering accuracy of the conventional polarization analyzer is an error of angle of the polarizer. On the other hand, the optical axis direction, i.e., the direction of the grooves of the polarizer according to the present invention can be accurately aligned. For example, a pattern drawn by the electron beam lithography has an accuracy of 1 mrad (0.057°).

Examples in which the polarization analyzer is built in a transmission path are shown in FIGS. 8 to 11.

Figure 8:
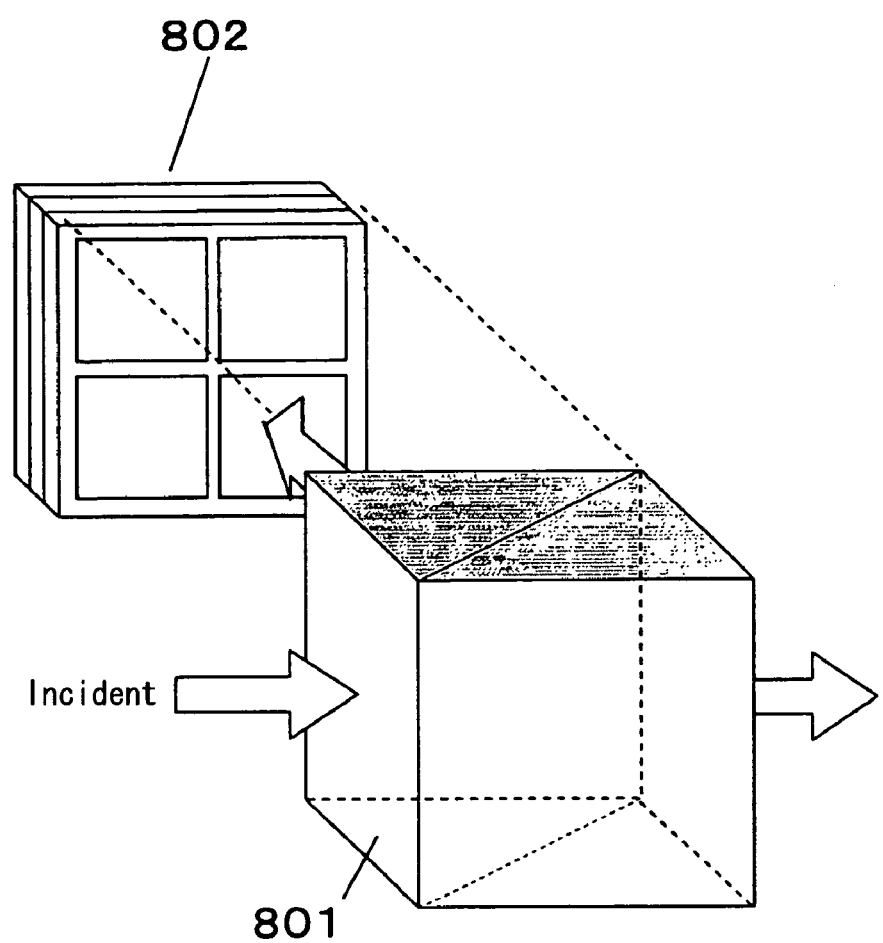
FIG. 8 shows an example of a method of building a polarization analyzer in an optical path.

FIG. 8 shows an example in which a light beam splitter 801 is used to split a light beam. The split light is guided to a polarization analyzer 802 composed of a polarizer array, a waveplate, and a light-receiving device array shown in FIG. 5 or the like. A main light beam propagates without axial displacement. In this case, a beam splitter which has a degree of polarization dependency set as low as possible is suitably applied. However, in a general beam splitter, polarization dependency may be generated in a wide wavelength range. In this case, the following configuration is preferably used.

Figure 9:
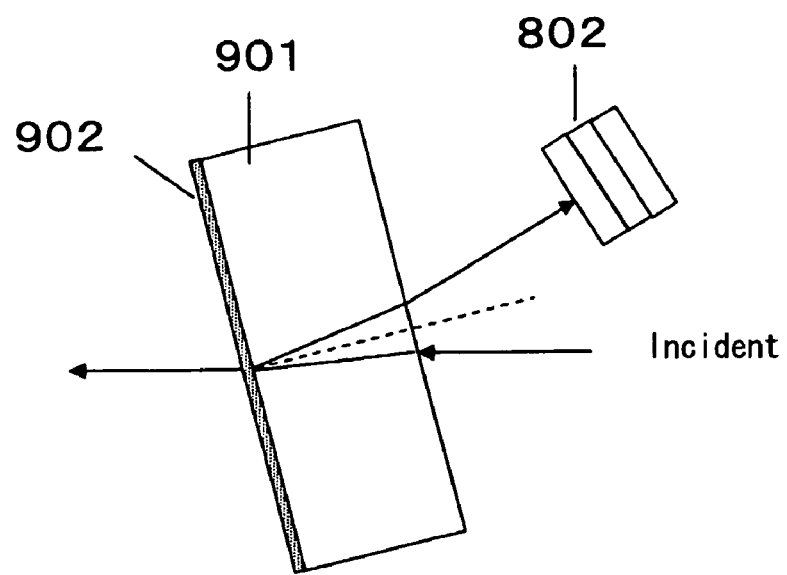
FIG. 9 shows another example of the method of building a polarization analyzer in an optical path.

FIG. 9 shows a configuration in which a degree of polarization dependency of the beam splitter is made sufficiently small. For example, a glass plate 901 having a thickness of 5 mm is arranged such that an incident angle is set at 4° to a collimated light beam. A reflectance obtained when light is obliquely incident has polarization dependency. However, when the incident angle is sufficiently small, the difference can be neglected in measurement. For example, considering a case in which light is incident from the air on a glass substrate (refractive index: 1.5), when the incident angle is 4°, the reflectance is 4.026% in S polarization (polarization perpendicular to an incident surface) and 3.974% in P polarization (parallel to the incident surface). The difference is sufficiently small, i.e., 0.052%.

An antireflective film is formed on a surface on the incident side, and a film 902 having a reflectance of, e.g., 10% is formed on the rear surface. The reflectance of the reflective film must be changed as needed, and the reflective film is not necessary if a sufficient reflectance can be obtained. Light being incident on the glass 901 is reflected by the rear surface and guided to the polarization analyzer 802 obtained by integrating the waveplate, the polarizer, and the photodetector with each other. On the other hand, the transmitted light is returned to the transmission path. The polarization analyzer may be separated from the glass, or may be in tight contact with the glass. In this case, the polarization analyzer may be controlled such that the light beam is irradiated on the center of the four polarizers.

Figure 10:
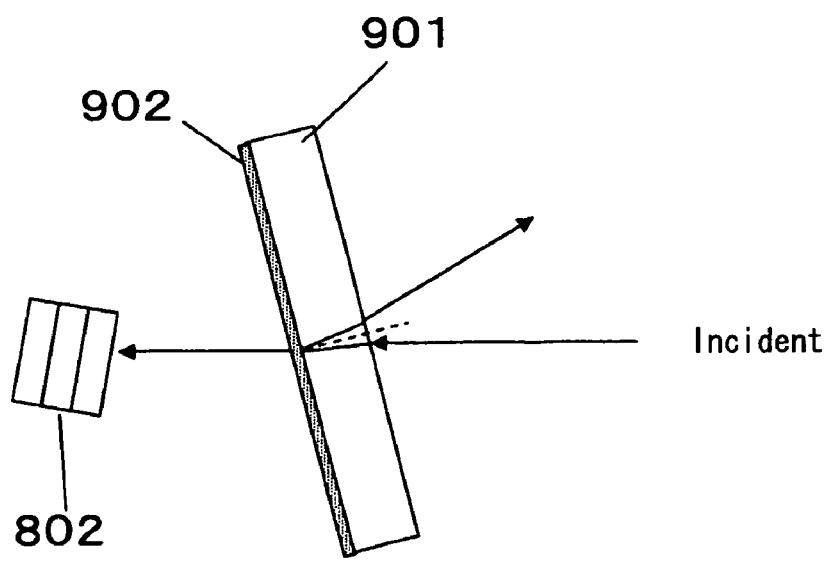
FIG. 10 shows still another example of the method of building a polarization analyzer in an optical path.

FIG. 10 shows another configuration. The incident side of the quartz glass 901 having a thickness of 1 mm is subjected to AR (antireflection) coating to form a mirror 902 having a reflectance of, e.g., 90% on the rear surface. The polarization analyzer 802 composed of the waveplate, the polarizer, and the photodetector is arranged on the rear surface side. Light reflected by the rear surface of the quartz glass is guided to the transmission path. In this case, a thin glass substrate can be advantageously used.

Figure 11:
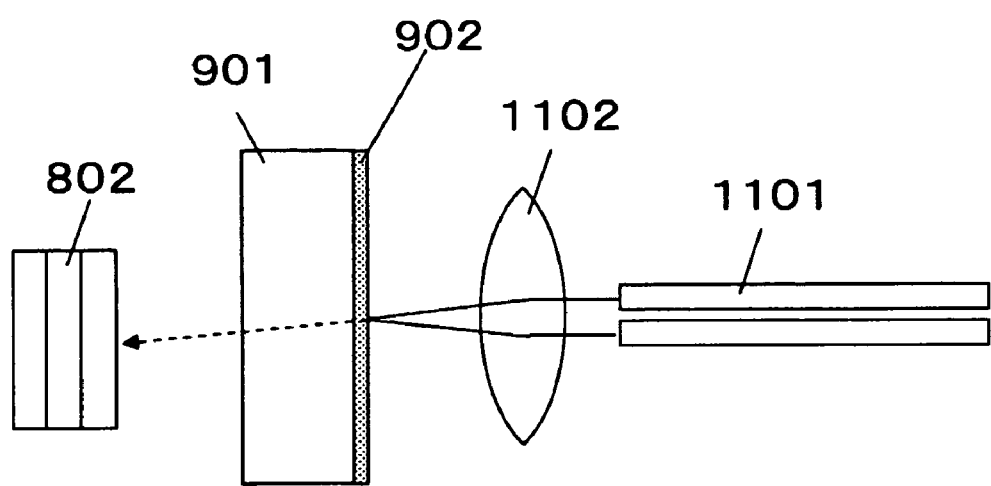
FIG. 11 shows still another example of the method of building a polarization analyzer in an optical path.

FIG. 11 shows still another configuration. Signal light is emitted from one of two optical fibers 1101 that are closely set in parallel. The light is irradiated on the glass plate 901 through a collimate lens 1102. The reflective film 902 having a dielectric mirror is formed on the front surface. Some optical power is reflected by the reflective film 902, and the remaining is transmitted through the reflective film 902. The transmitted light is irradiated on the polarization analyzer 802. The reflected light passes through the lens again, and is coupled to the other optical fiber. In this manner, the in-line type polarization analyzer can be integrated with a small size. Since the incident angle to the glass substrate can be reduced, a degree of polarization dependency of the reflectance can be suitably reduced.

The configuration having the four polarizer-regions is described in FIG. 5. As shown in FIGS. 8 to 11, the polarization analyzer is controlled such that the center of the optical beam is aligned to the center of the four regions. However, a variation in position of the beam causes a variation in power, a measurement error is generated. A method of solving this problem will be described in the following embodiment. However, small regions may be set. When light-receiving intensities of light in the same polarization are summed, the error of the variation in position can be reduced.

Although such a polarization analyzer is used in various applications, an application to optical communication will be described. FIG. 18A shows an example in which the polarization analyzer is used as a polarization stabilizer (stabilizing apparatus). Reference numeral 1801 denotes the polarization analyzer. Reference numeral 1802 denotes a polarization controller, and is composed of a means for giving a phase difference of a half wave plate 1803, a means for giving a phase difference of a quarter wavelength 1804, and a control unit 1805. For these components, for example, a liquid crystal rotatable waveplate (Y. Ohtera, T. Chiba, and S. Kawakami, "Proposition and experiments of liquid crystal rotatable waveplate", The Institute of Electronics, Information and Communication Engineers, Society Conference, C-173, September, 1995) can be used. A part of light emitted from the polarization controller is guided to the polarization analyzer to measure a polarization state. An error from a desired polarization state is calculated from the obtained Stokes' parameters to give an electric signal of a correction amount from the control unit to each rotatable waveplate. An optical device having polarization dependency is connected to the output of the polarization analyzer. The polarization of light transmitted through an optical fiber is not constant, the optical device to be connected in general is required to be independent of the polarization. This causes serious obstruction sometimes. However, the polarization stabilizer composed of the compact and high-accurate polarization analyzer described in the present invention can be used, it is sufficient that the device can operate in specific polarization.

FIG. 18B shows an example in which the polarization analyzer is used in a polarization mode dispersion compensation (PMDC) required in optical communication at a high bit rate (for example 40 Gb/s). In the previous stage of a light-receiving device 1808 for optical signal, transmitted light passes through a polarization mode dispersion compensator 1807 (device which delays two orthogonal polarized waves), and a part of the light is guided to a polarization analyzer 1806 according to the present invention. On the basis of the Stokes' parameters obtained here, a degree of polarization (DOP) is calculated. A compensation amount of polarization mode dispersion is controlled such that the DOP is maximum. Since the PMDC is required for each wavelength in wavelength multiplex communication, the compact and high-accurate polarization analyzer is considerably useful.

Another embodiment will be described below.

Figure 12:
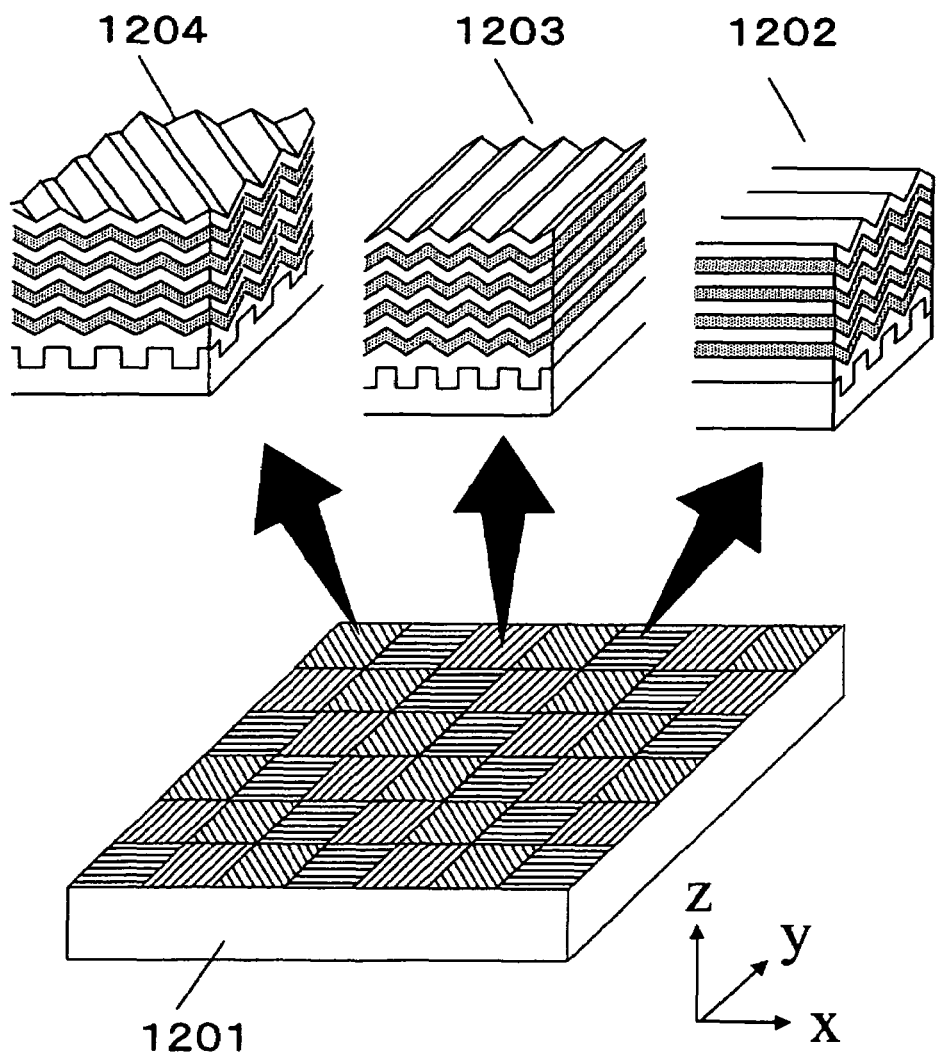
FIG. 12 is a diagram showing a configuration of a small polarizer array having optical axes of three types.

In this example, a small polarizer array consisting of autocloning photonic crystal and having different optical axis directions and an example of a polarization analyzer using the small polarizer array are described. FIG. 12 is a conceptual diagram of the small polarizer array. Regions of each polarizer are composed of a multilayer film consisting of $Ta_2O_5$ and $SiO_2$, and have a periodic uneven surface shape. In this case, an in-plane period was 0.44 µm, a lamination period was 0.44 µm, and a ratio of thicknesses of a $Ta_2O_5$ film and an $SiO_2$ film was 4:6 so that the polarization analyzer operates in a band of a wavelength of 0.8 µm. When light is incident on the structure in FIG. 1 in a perpendicular direction, polarized light parallel to a groove is reflected and attenuated in a transmitting direction at an attenuation rate of about 30 dB in 15 periods. On the other hand, polarized light perpendicular to the groove propagates. The transmitting loss of the propagation is 0.1 dB or less in 10 periods.

The directions of grooves to be formed in the substrate of a polarizer array 1201 are set such that, as shown in FIG. 12, regions of three types, i.e., a region 1202 having an angle of 0° to the x axis, a region 1203 having an angle of 90° to the x axis, and a region 1204 having an angle of 45° to the x axis are formed in the form of a mesh. An order of arrangements is not limited to a specific order. The order may be arbitrary. Groove formation in the substrate surface is performed by using electron beam lithography and reactive etching. In addition, the grooves can be formed by lithography if an optical wavelength suitable for a pitch is selected. The size of the small region is 50 µm-square. However, the small region may be larger than (for example, 1000 µm-square) or smaller than 50 µm-square (for example, 5 µm-square). The pattern is not limited to a square pattern, but also an arbitrary pattern such as a triangle pattern, a rectangle pattern, or a hexagonal pattern. In this manner, a polarizer array in which transmitting polarization directions change depending on regions can be formed.

Figure 13:
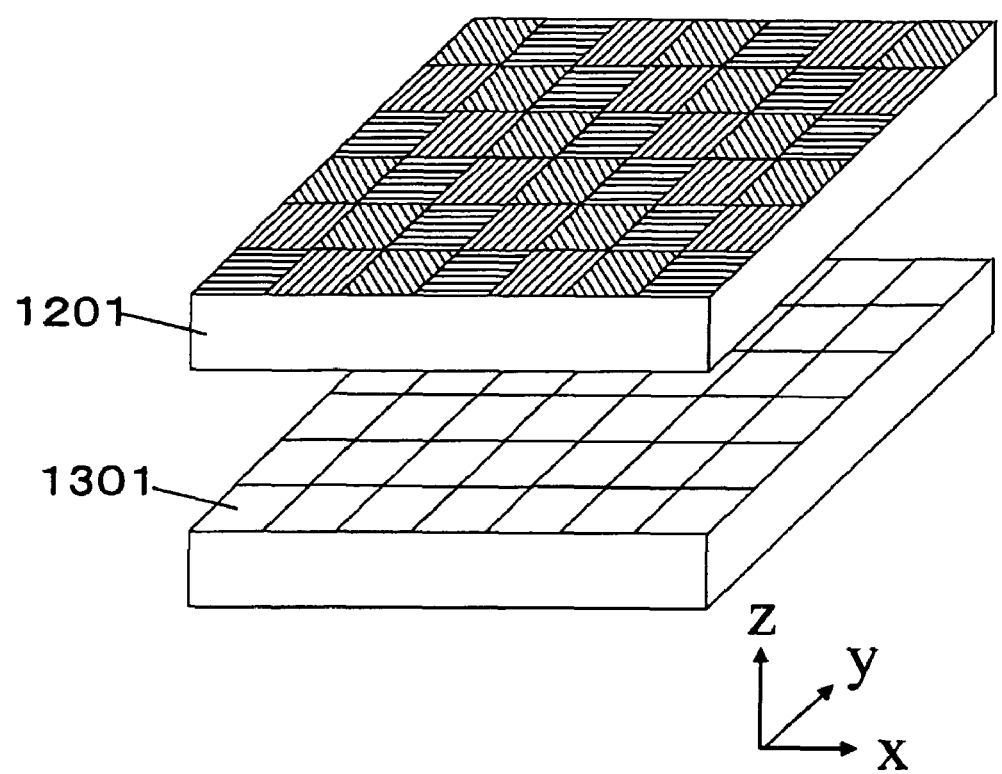
FIG. 13 is an example of a polarization analyzer composed of a small polarizer array having optical axes of three types and a light-receiving device array.

The polarizer array 1201, as shown in FIG. 13, is mounted on a light-receiving device array 1301 in which pixels are arranged at equal periods to measure a polarization state. The light-receiving device may be a CCD, a semiconductor photodiode, or an image pickup tube. A structure which does not use a waveplate array, information to be obtained is limited (the rotating direction of elliptically polarized light is not known). However, the structure is useful because the structure is simple.

Since the size of one region (pixel) ranges from several µm to several ten µm in a CCD, the CCD is combined to a small polarizer array to observe a polarization state of light as accurate image information. This can observe the polarization state of reflected light and transmitted light from a material and the polarization state of reflected light from a surface of earth, a water surface, and the like. For example, light is transmitted or reflected by glass, an optical disk, or other structures, a change in polarization state can also be measured by a birefringent index excited by strain. Furthermore, when the structure is built in a microscope, microscopic polarization analysis can also be performed.

The number of orientations of the polarizers are three in the example in FIG. 13. The number of axial directions of the uneven pattern may be two, i.e., 0° and 90°, or four or more axial directions may be used. In these cases, the long-axis direction of elliptical polarization (including linear polarization) can be measured. However, a phase difference or a rotating direction cannot be observed. More specifically, any one of the phase of vertically polarized light and the phase of horizontally polarized light cannot be determined as an advanced phase.

As described above, in order to calculate all Stokes' parameters, a quarter waveplate must overlap a polarizer region having an orientation of 45°.

Figure 14:
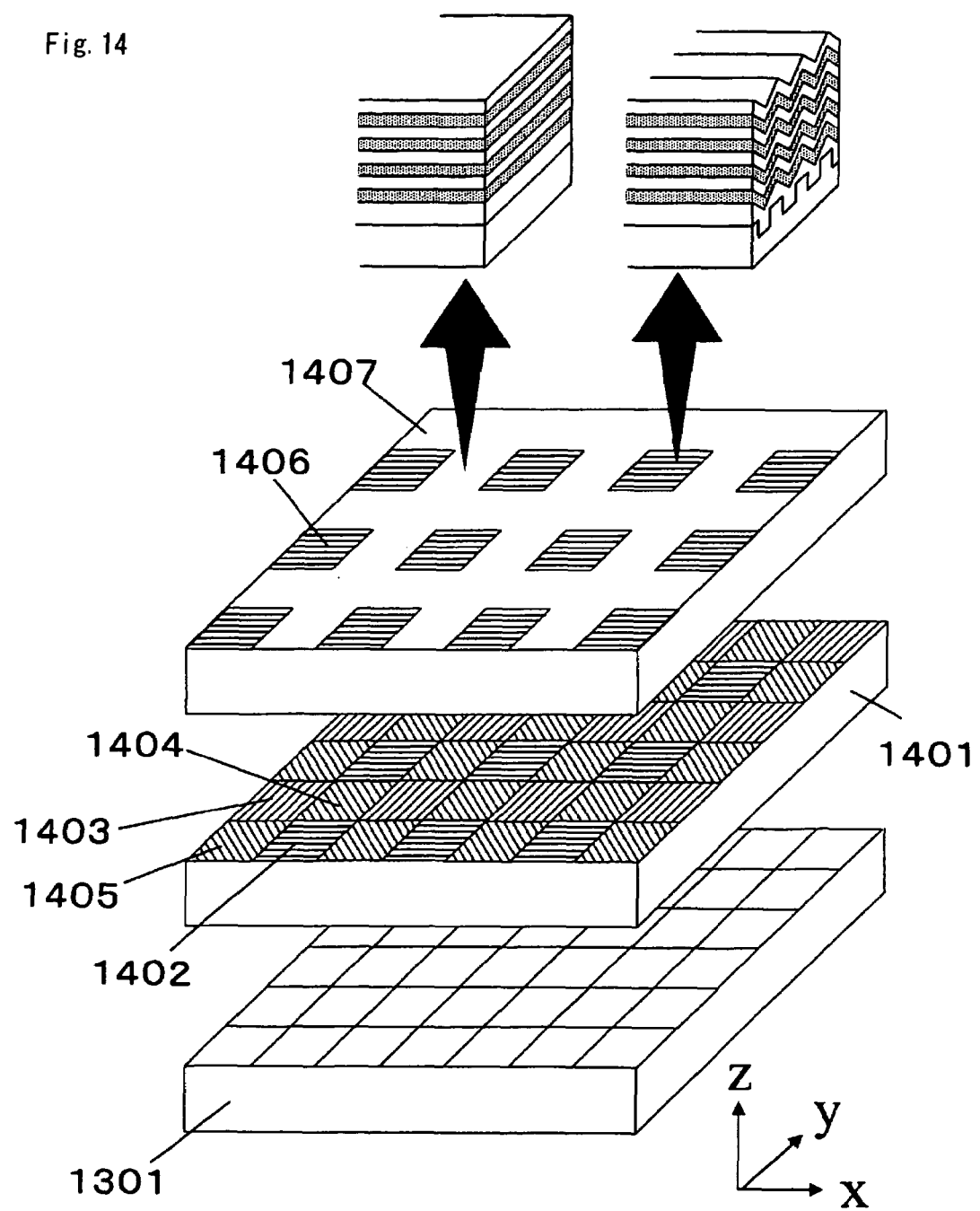
FIG. 14 shows an example of a polarization analyzer composed of a small polarizer array having optical axes of three types, a quarter waveplate, and a light-receiving device array.

FIG. 14 is a conceptual diagram of a polarization analyzer which can measure all Stokes' parameters. In a polarizer array 1401, four regions are used as one unit. However, the number of types of regions serving as one unit may be four or more. A region having an uneven pattern having an axial direction set at 0° to the x axis is defined as a first region 1402, a region having an uneven pattern having an axial direction set at 90° to the x axis are defined as a second region 1403, and regions each having an uneven pattern having an axial direction set at 45° to the x axis are defined as a third region 1404 and a fourth region 1405, respectively. A phase plate array is arranged on the previous stage (incident side of light) of the polarizer array. However, a region 1406 operating as a quarter waveplate composed of an uneven pattern is matched on only the fourth region of the polarizer, and a structure 1407 in which the waveplate array does a phase difference is matched on the first to third regions of the polarizer. More specifically, the structure composed of a flat multilayer film and being free from polarization dependency is achieved.

A method of fabricating the polarization analyzer will be described below. A method of fabricating the polarizer array 1401 is basically the same as the method described above. The groove pattern has four regions as one unit. The size of each region is 40 µm-square. The size may be larger than or smaller than 40 µm-square. The region 1402 having grooves formed at 0° to the x axis and the region 1403 having grooves formed at 90° to the x axis are formed for one regions, respectively, and the regions 1404 and 1405 having grooves formed at 45° to the x axis are formed. The arrangement is not limited to a specific arrangement, the regions 1404 and 1405 may be adjacent to each other or separated from each other. Thereafter, a multilayer film consisting of $Ta_2O_5$ and $SiO_2$ is formed. The parameters of the structure are the same as those described in FIG. 12. After the final layer of the polarizer is laminated, the polarizer is subjected to antireflection coating (AR coating) as needed.

A λ/4 plate array 1406 will be described below. A groove pattern parallel to the x axis is formed on only one part of the four regions of the polarizer. Thereafter, a $Ta_2O_5$ layer and an $SiO_2$ layer are alternately laminated by an autocloning method. In this case, an in-plane period is 0.30 µm, and a lamination period is 0.36 µm. Since a phase difference of 0.031 π is obtained per period, λ/4 plates may be laminated at 16 periods. The part 1406 having a pattern serves as a λ/4 plate, and a flat multilayer film is laminated on the part 1407 having no pattern. For this reason, a phase difference is not generated. In this manner, a waveplate can be formed in only one of the four regions.

The polarizer array and the phase plate array are pasted to each other such that the film surfaces of these arrays are matched with each other. It is important that one of the regions having an axis set at 45° in the polarizer overlaps the λ/4 plate region of the phase plate array. For example, a substrate on which the polarizer array is laminated and a substrate on which the waveplate may be fixed to each other by an adhesive agent while observing the substrates with a microscope.

When the polarizer array and the waveplate are integrated with each other, as described above, after the $SiO_2$ layer serving as the final layer of the polarizer is laminated, the surface of the layer is flattened by sputter etching or mechanical polishing. Thereafter, an uneven line-and-space pattern is formed on a part where a waveplate is formed by lithography again. In alignment of the pattern, an alignment marker may be applied on a part of the substrate. Thereafter, a multilayer film may be laminated to form a waveplate. In this manner, the polarizer array and the waveplate can be integrated with each other, or the waveplate array may be formed on the rear side of the substrate on which the polarizer array is formed.

A light-receiving device array which can independently receive light transmitted through the polarizer regions is arranged. The light-receiving device may be a CCD, a semiconductor photodiode, or an image pickup tube. Although the polarization analyzer in FIG. 13 cannot measure phase difference information, the polarization analyzer in FIG. 14 can measure the phase difference information. A change in phase of reflected or transmitted light from an object to be measured is measured as an image to make it possible to perform polarization analysis of a large area.

Still another example will be described below. An example in which a polarization analyzer is used as an accurate sensor for a polarization angle will described here. FIG. 17A shows an example of the structure. Reference numeral 1701 denotes a polarizer to align the directions of polarization of incident light. The polarizer 1701 may be photonic crystal polarizer or an existing polarizer. Reference numeral 1702 denotes a polarizer array used as an analyzer. As the polarizer array 1702, a photonic crystal polarizer is used. The polarizer is divided into a plurality of regions (in this case, 5 regions), and is designed such that the directions of polarization of light transmitted through the regions are slightly different from each-other. More specifically, the directions of grooves are made slightly different from each other. In the central polarizer, the groove direction is set at almost 90° to the polarizer on the incident side to achieve crossed Nicols. Reference numeral 1703 denotes a light-receiving device array which is arranged to make it possible to receive light transmitted through the regions of the polarizer array. Before and after a measurement sample 1704 is arranged between the two polarizers, output values from the light-receiving array are read. A loss of the sample, an amount of change $\Delta\theta$ in a polarization direction, and an amount of phase change $\Delta\phi$ are fitted as unknown values on a theoretical curve of an angular characteristic of transmittance to calculate the values. In this manner, the polarized light can be measured without any moving part. An angular pitch and the number of regions of the polarization array are appropriately set by measurement ranges and accuracies of the amount of change $\Delta\theta$ and the amount of phase change $\Delta\phi$. FIG. 17B shows a relationship between an angle and a transmittance of the analyzer. A broken line in FIG. 17B indicates a reference obtained before the sample is set. An extinction ratio of the polarizer on the incident side is about 47 dB. A solid line indicates a transmittance obtained after the sample is set (in this case, it is assumed that a loss is negligible). For example, if it is predicted that a prediction rotating angle is sufficiently small, an angular pitch of the polarizer used as an analyzer is set at 0.5°, and five values of 44° to 46° are set as angles. It is understood that an amount of change $\Delta\theta$ of 0.29° indicated by a solid line is sufficiently measured. Such measurement can be realized only after a large number of polarizers each having a high extinction ratio are arranged such that optical axes are set at high accuracy.

The example in which the small amount of change $\Delta\theta$ is measured at high accuracy is described above. However, in order to measure the amount of change $\Delta\theta$ in a wider range, the angles of the polarizers must be set in a wide range. For example, 6 regions may be set at 30° pitches, i.e., the amount of change $\Delta\theta$ may be measured in a 180° range.

INDUSTRIAL APPLICABILITY

A polarization control device array composed of the structure according to the present invention makes it possible to form a plurality of polarizer regions or waveplate regions having different optical axes on one substrate with high performance, arbitrary sizes, and arbitrary shapes. Polarizers constituted in the structure or a polarizer and a waveplate are combined to each other and further integrated with a light-receiving array to constitute a polarization analyzer with a simple structure although a conventional polarization analyzer has a complex structure. For this reason, an optical beam is split once to make it possible to perform polarization analysis. The devices to be arrayed are reduced in size and increased in number to make it possible to also perform polarization analysis by image processing. The polarization analyzer is used for various industrial purposes, and can be replaced with a conventional polarization analyzer.

The invention claimed:

1. A polarizer array which has a multilayer structure in which at least two transparent materials are alternately laminated in a z direction on one substrate parallel to an x-y plane in an orthogonal coordinate system x, y, and z, wherein the multilayer structure is divided into at least three different regions in the x-y plane, each layer has one-dimensional periodic concave and convex shapes repeated in one direction defined in each region on the x-y plane, and, with respect to light being incident on the x-y plane in a perpendicular or oblique direction, only a polarized light parallel or perpendicular to the concave and convex shape in each region is transmitted.

2. The polarizer array according to claim 1, wherein repeating directions of the one-dimensional periodic concave and convex shapes are different from each other by 45° or less in the at least three regions.

3. The polarizer array according to claim 1, wherein the multilayer structure has at least one region in which the repeating direction of the one-dimensional periodic concave and convex shapes is set at 0° to an x axis, at least one region in which the repeating direction of the one-dimensional periodic concave and convex shapes is set at 45° to the x axis, and at least one region in which the repeating direction of the one-dimensional periodic concave and convex shapes is set at 90° to the x axis.

4. A polarization analyzer comprising: the polarizer array according to any one of claims 1 to 3 and a light-receiving array which can independently receive light transmitted through the regions.

5. The polarization analyzer according to claim 4, wherein a quarter waveplate is arranged in at least one region of the polarizer array such that the quarter waveplate serves as a common optical path on a light incident side.

6. The polarization analyzer according to claim 5 wherein the light-receiving device array is any one of a photodetector, a CCD, and an image pickup tube.

7. A polarization stabilizer comprising: the polarization analyzer according to claim 5; a means for splitting a light beam; and a means for controlling polarization.

8. A polarization mode dispersion compensator comprising: the polarization analyzer according to claim 5; and a means for being able to give a variable phase difference between orthogonal polarization modes.

9. The polarization analyzer according to claim 4, wherein a waveplate operating as a quarter waveplate is arranged in at least one region of the polarizer array such that the waveplate serves as a common optical path on a light incident side, wherein the waveplate which has a multilayer structure in which at least two transparent materials are alternately laminated in a z direction on one substrate parallel to an x-y plane in an orthogonal coordinate system x, y, and z, wherein the multilayer structure is divided into at least two regions in the x-y plane, each layer has one-dimensional periodic concave and convex shapes parallel to the x-axis direction in at least one of the regions, each layer is flat in at least one of the other regions, and a phase difference between orthogonal polarized light is given to light which is incident in a direction unparallel to the substrate and which is transmitted through the region having the one-dimensional periodic concave and convex shapes.

10. The polarization analyzer according to claim 9 wherein the light-receiving device array is any one of a photodetector, a CCD, and an image pickup tube.

11. A polarization stabilizer comprising: the polarization analyzer according to claim 9; a means for splitting a light beam; and a means for controlling polarization.

12. A polarization mode dispersion compensator comprising: the polarization analyzer according to claim 9; and a means for being able to give a variable phase difference between orthogonal polarization modes.

13. The polarization analyzer according to claim 4, wherein the light-receiving device array is any one of a photodetector, a CCD, and an image pickup tube.

14. A polarization mode dispersion compensator comprising: the polarization analyzer according to claim 13; and a means for being able to give a variable phase difference between orthogonal polarization modes.

15. A polarization stabilizer comprising: the polarization analyzer according to claim 4; a means for splitting a light beam; and a means for controlling polarization.

16. A polarization mode dispersion compensator comprising: the polarization analyzer according to claim 4; and a means for being able to give a variable phase difference between orthogonal polarization modes.

17. A waveplate which has a multilayer structure in which at least two transparent materials are alternately laminated in a z direction on one substrate parallel to an x-y plane in an orthogonal coordinate system x, y, and z, wherein the multilayer structure is divided into at least two regions in the x-y plane, each layer has one-dimensional periodic concave and convex shapes parallel to the x-axis direction in at least one of the regions, each layer is flat in at least one of the other regions, and a phase difference between orthogonal polarized light is given to light which is incident in a direction unparallel to the substrate and which is transmitted through the region having the one-dimensional periodic concave and convex shapes.

* * * * *